US012764314B2

(12) United States Patent
Paluri et al.

(10) Patent No.: US 12,764,314 B2
(45) Date of Patent: Oct. 13, 2026

(54) DPB OPERATION-BASED IMAGE OR VIDEO CODING

(71) Applicant: LG Electronics Inc., Seoul (KR)

(72) Inventors: Seethal Paluri, Seoul (KR); Hendry Hendry, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 18/009,610

(22) PCT Filed: Jun. 7, 2021

(86) PCT No.: PCT/KR2021/007057
§ 371 (c)(1),
(2) Date: Dec. 9, 2022

(87) PCT Pub. No.: WO2021/251700
PCT Pub. Date: Dec. 16, 2021

(65) Prior Publication Data

US 2023/0224484 A1 Jul. 13, 2023

Related U.S. Application Data

(60) Provisional application No. 63/036,454, filed on Jun. 9, 2020.

(51) Int. Cl.
*H04N 19/423* (2014.01)
*H04N 19/172* (2014.01)
*H04N 19/70* (2014.01)

(52) U.S. Cl.
CPC ......... *H04N 19/423* (2014.11); *H04N 19/172* (2014.11); *H04N 19/70* (2014.11)

(58) Field of Classification Search
None
See application file for complete search history.

(56) References Cited

U.S. PATENT DOCUMENTS

2010/0238822 A1* 9/2010 Koyabu ............. H04N 21/4385 370/252
2014/0086336 A1* 3/2014 Wang ..................... H04N 19/44 375/240.26

(Continued)

FOREIGN PATENT DOCUMENTS

KR 101944565 1/2019
KR 102101535 4/2020
KR 20200037196 4/2020

OTHER PUBLICATIONS

Bross et al., "Versatile Video Coding (Draft 9)," Joint Video Experts Team (JVET) of ITU-T SG 16 WP 3 and ISO/IEC JTC 1/SC 29/WG 11, Document: JVET-R2001-vA, 18th Meeting: by teleconference, Apr. 15-24, 2020, 524 pages.

*Primary Examiner* — Lindsay J Uhl
(74) *Attorney, Agent, or Firm* — Fish & Richardson P.C.

(57) ABSTRACT

According to the disclosure of the present document, a decoded picture buffer (DPB) may be updated on the basis of DPB-related information. The DPB-related information may include a syntax element related to a maximum required size of the DPB. In updating the DPB, a bumping process may be invoked on the basis of a case where a first condition, in which the number of pictures in the DPB is neither greater than nor equal to a value obtained by adding 1 to a value of the syntax element related to the maximum required size of the DPB, is satisfied.

14 Claims, 10 Drawing Sheets

(56) References Cited

U.S. PATENT DOCUMENTS

| | | | | |
|---|---|---|---|---|
| 2015/0016806 | A1 | 1/2015 | Rodriguez et al. | |
| 2017/0105027 | A1 * | 4/2017 | Deshpande ............ | H04N 19/30 |
| 2019/0058895 | A1 * | 2/2019 | Deshpande .......... | H04N 19/423 |
| 2022/0232259 | A1 * | 7/2022 | Wang ................... | H04N 19/105 |

* cited by examiner

DPB OPERATION-BASED IMAGE OR VIDEO CODING

CROSS-REFERENCE TO RELATED APPLICATIONS

This application is a National Stage application under 35 U.S.C. § 371 of International Application No. PCT/KR2021/007057, filed on Jun. 7, 2021, which claims the benefit of U.S. Provisional Application No. 63/036,454, filed on Jun. 9, 2020. The disclosures of the prior applications are incorporated by reference in their entirety.

BACKGROUND OF THE DISCLOSURE

Field of the Disclosure

The present disclosure relates to a video or image coding technique and, more particularly, to a coding technique related to a decoded picture buffer (DPB) operation in a video coding system.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

In addition, a way to improve the efficiency of image/video coding is required, and for this, an effective coding technique related to a decoded picture buffer (DPB) operation is required.

SUMMARY

The present disclosure provides a method and apparatus for improving video/image coding efficiency.

The present disclosure also provides a method and apparatus for performing a DPB management process.

According to an embodiment of the present disclosure, a DPB may be updated based on decoded picture buffer (DPB) related information. The DPB related information may include a syntax element related to a maximum required size of the DPB. In updating the DPB, bumping process may be invoked based on a case of satisfying a first condition in which the number of pictures in the DPB is not greater than or equal to a value of the syntax element related to a maximum required size of the DPB plus 1.

Furthermore, according to an embodiment of the present disclosure, the DPB related information may include a syntax element related to a maximum picture reorder number of the DPB or a syntax element related to maximum latency of the DPB. The invoking of the bumping process is not determined based on a second condition based on the syntax element related to a maximum picture reorder number of the DPB or a third condition based on the syntax element related to maximum latency of the DPB. For example, when the second condition or the third condition is satisfied, but the first condition is not satisfied, the bumping process may not be invoked.

Furthermore, according to an embodiment of the present disclosure, a DPB fullness may be decreased by 1 for a picture storage buffer that is emptied in the DPB during the bumping process that is invoked based on the case that the first condition is satisfied.

Furthermore, according to an embodiment of the present disclosure, after the bumping process invoked based on the case that the first condition is satisfied is performed, an operation of decreasing a DPB fullness by 1 for a picture storage buffer that is emptied in the DPB may not be performed.

Furthermore, according to an embodiment of the present disclosure, whether the bumping process is invoked may be determined based on whether the current picture is the first picture of a current access unit (AU) that is a coded video sequence start (CVSS) access unit (AU) that is not AU 0.

According to an embodiment of the present document, a video/image decoding method performed by a decoding apparatus is provided. The video/image decoding method may include the method disclosed in the embodiments of this document.

According to an embodiment of the present document, a decoding apparatus for performing video/image decoding is provided. The decoding apparatus may include the method disclosed in the embodiments of this document.

According to an embodiment of the present document, a video/image encoding method performed by an encoding apparatus is provided. The video/image encoding method may include the method disclosed in the embodiments of this document.

According to an embodiment of the present document, an encoding apparatus for performing video/image encoding is provided. The encoding apparatus may include the method disclosed in the embodiments of this document.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

Advantageous Effects

According to the present disclosure, various effects may be provided. For example, according to an embodiment of the present disclosure, overall image/video compression efficiency may be improved. Furthermore, according to an embodiment of the present disclosure, a DPB management process is efficiently performed, and a DPB operation may be improved. Furthermore, according to an embodiment of the present disclosure, the DPB fullness may be decreased only once when a picture buffer is emptied in a bumping process, and the accuracy of an output order operation of a DPB may be improved. Further, the number of invoke condition check numbers of the bumping process is decreased, and complexity may be decreased. Accordingly, the accuracy and efficiency may be improved in a DPB management (i.e., output and removal operation of a picture in a DPB).

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document, but may include various effects that can be understood or induced from the technical features of the present document.

DESCRIPTION OF EXEMPLARY EMBODIMENTS

Figure 1:
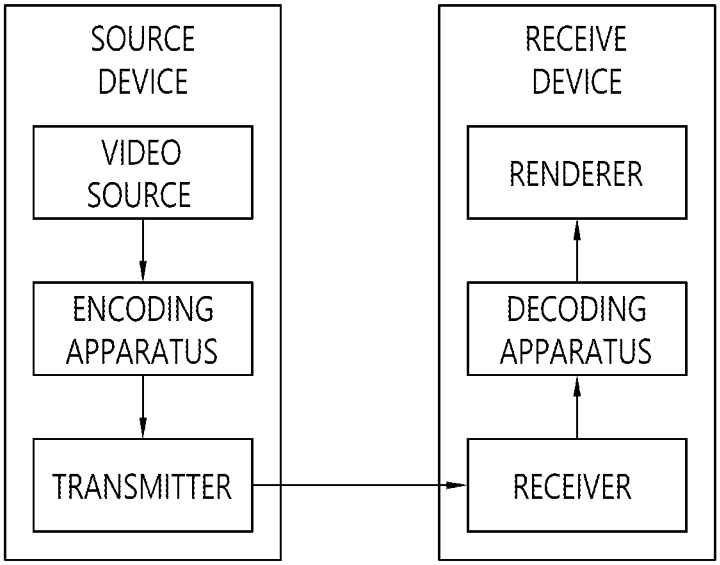
FIG. 1 briefly illustrates an example of a video/image coding device to which embodiments of the present document are applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

Technical features that are individually described in one drawing in this document may be implemented individually or may be implemented at the same time.

Hereinafter, preferred embodiments of this document are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded video/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
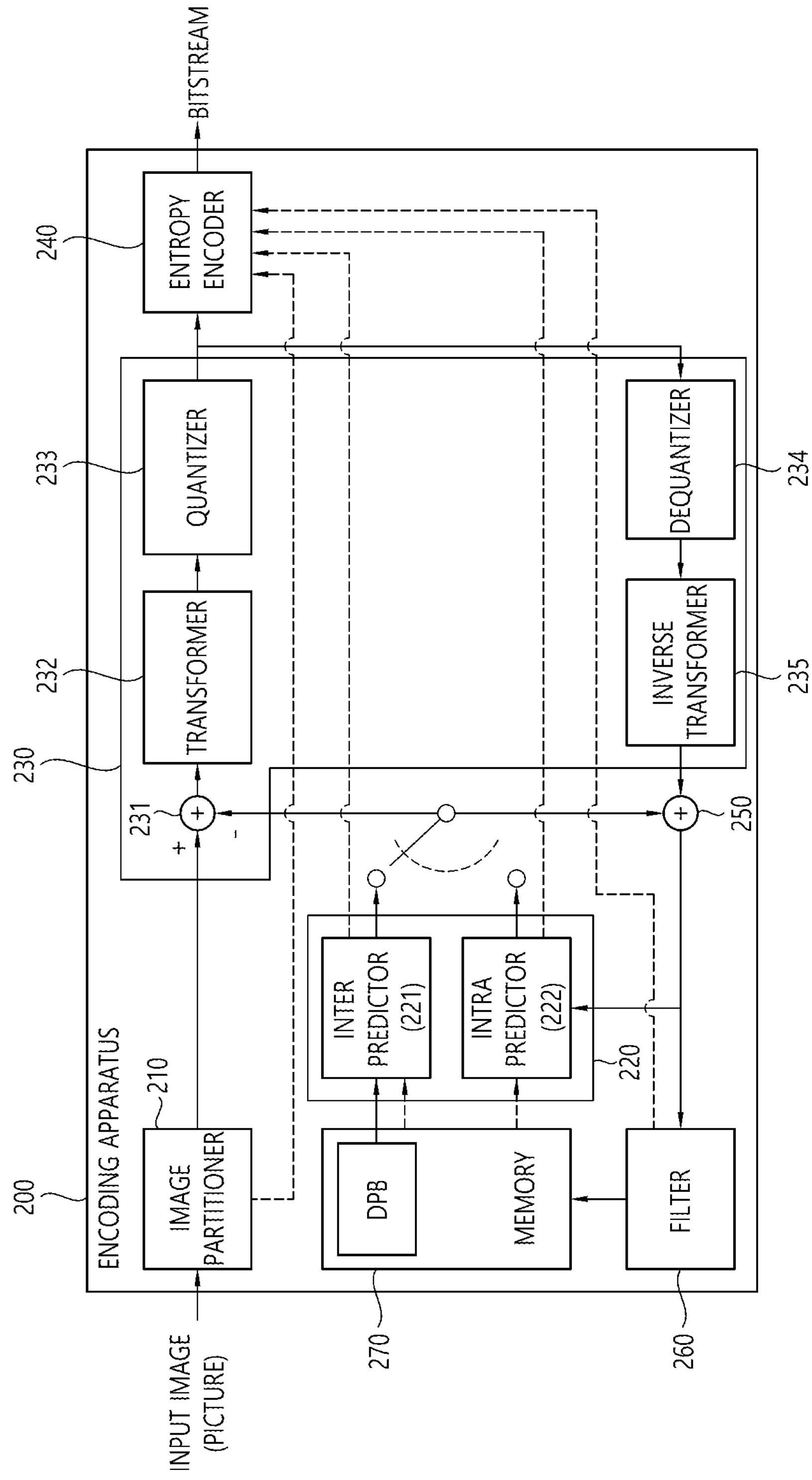
FIG. 2 is a schematic diagram illustrating a configuration of a video/image encoding apparatus to which the embodiment(s) of the present document may be applied.

FIG. 2 is a diagram schematically illustrating a configuration of a video/image encoding apparatus to which the embodiments of the present document may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
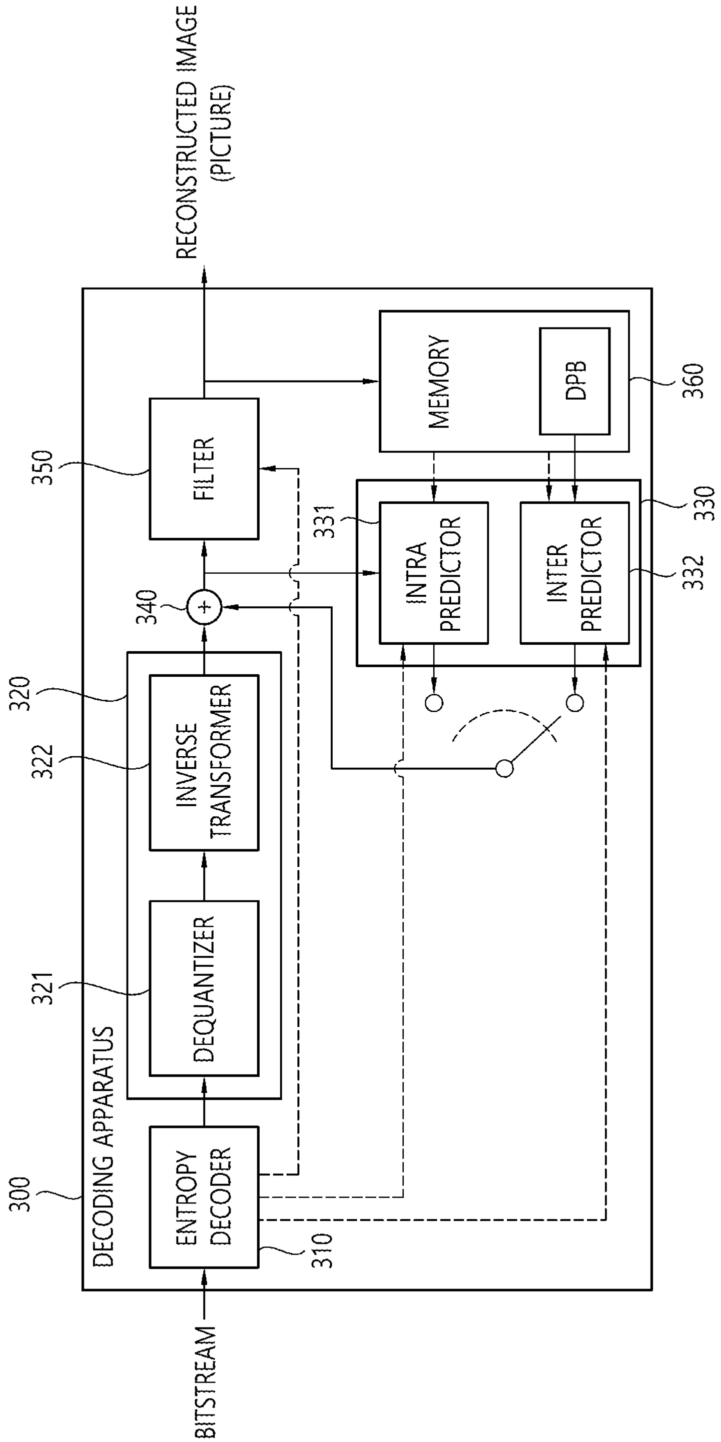
FIG. 3 is a schematic diagram illustrating a configuration of a video/image decoding apparatus to which the embodiment(s) of the present document may be applied.

FIG. 3 is a diagram for schematically explaining a configuration of a video/image decoding apparatus to which the embodiments of the present document may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, a picture output and removal process from a decoded picture buffer (DPB) may be performed. The picture output and removal process from a decoded picture buffer (DPB) in the conventional VVC standard for a video/image coding system may be as represented in the following table.

TABLE 1

Picture output and removal from the DPB process.
VVC invoked picture output process once per picture before decoding of the current picture (but after parsing the slice header of the first slice of the current picture) as described below:
Removal of pictures from the DPB before decoding of the current picture
The removal of pictures from the DPB before decoding of the current picture (but after parsing the slice header of the first slice of the current picture) happens instantaneously at the CPB removal time of the first DU of AU n (containing the current picture) and proceeds as follows:
- The decoding process for reference picture list construction as specified in clause 8.3.2 is invoked and the decoding process for reference picture marking as specified in clause 8.3.3 is invoked.
- When the current AU is a CVSS AU that is not AU 0, the following ordered steps are applied:
  1. The variable NoOutputOfPriorPicsFlag is derived for the decoder under test as follows:
     - If the value of PicWidthMaxInSamplesY, PicHeightMaxInSamplesY, MaxChromaFormat, MaxBitDepthMinus8, or max_dec_pic_buffering_minus1[ Htid ] derived for the current AU is different from the value of PicWidthMaxInSamplesY, PicHeightMaxInSamplesY, MaxChromaFormat, MaxBitDcpthMinus8, or max_dec_pic_buffering_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.
       NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case.
     - Otherwise, NoOutputOfPriorPicsFlag is set equal to ph_no_output_of_prior_pics_flag of the current AU.
  2. The value of NoOutputOfPriorPicsFlag derived for the decoder under test is applied for the HRD, such that when the value of NoOutputOfPriorPicsFlag is equal to 1, all picture storage buffers in the DPB arc emptied without output of the pictures they contain, and the DPB fullness is set equal to 0.
- When both of the following conditions are true for any pictures k in the DPB, all such pictures k in the DPB arc removed from the DPB:
  - picture k is marked as “unused for reference”.
  - picture k has PictureOutputFlag equal to 0 or its DPB output time is less than or equal to the CPB removal time of the first DU (denoted as DU m) of the current picture n; i.e., DpbOutputTime[ k ] is less than or equal to DuCpbRemovalTime[ m ].
- For each picture that is removed from the DPB, the DPB fullness is decremented by one.

...

Output and removal of pictures from the DPB
The output and removal of pictures from the DPB before the decoding of the current picture (but after parsing the slice header of the first slice of the current picture) happens instantaneously when the first DU of the AU containing the current picture is removed from the CPB and proceeds as follows:
- The decoding process for reference picture list construction as specified in clause 8.3.2 and decoding process for reference picture marking as specified in clause 8.3.3 are invoked.
- If the current AU is a CVSS AU that is not AU 0, the following ordered steps are applied:
  1. The variable NoOutputOfPriorPicsFlag is derived for the decoder under test as follows:
     - If the value of PicWidthMaxInSamplesY, PicHeightMaxInSamplesY, MaxChromaFormat, MaxBitDepthMinus8, or max_dec_pic_buffering_minus1[ Htid ] derived for the current AU is different from the value of PicWidthMaxInSamplesY, PicHeightMaxInSamplesY, MaxChromaFormat, MaxBitDepthMinus8, or max_dec_pic_buffering_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.
       NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case.
     - Otherwise, NoOutputOfPriorPicsFlag is set equal to ph_no_output_of_prior_pics_flag of the current AU.
  2. The value of NoOutputOfPriorPicsFlag derived for the decoder under test is applied for the HRD as follows:
     - If NoOutputOfPriorPicsFlag is equal to 1, all picture storage buffers in the DPB are emptied without output of the pictures they contain and the DPB fullness is set equal to 0.
     - Otherwise (NoOutputOfPriorPicsFlag is equal to 0), all picture storage buffers containing a picture that is marked as “not needed for output” and “unused for reference” are emptied (without output) and all non-empty picture storage buffers in the DPB are emptied by repeatedly invoking the “bumping” process specified in clause C.5.2.4 and the DPB fullness is set equal to 0.
- Otherwise (the current AU is not a CVSS AU), all picture storage buffers containing a picture which are marked as “not needed for output” and “unused for reference” are emptied (without output). For each picture storage buffer that is emptied, the DPB fullness TABLE 1-continued

| |
|---|
| is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:<br>- The number of pictures in the DPB that are marked as "needed for output" is greater than max_num_reorder_pics[ Htid ]<br>- max_latency_increase_plus1[ Htid ] is not equal to 0 and there is at least one picture in the DPB that is marked as "needed for output" for which the associated variable PicLatencyCount is greater than or equal to MaxLatencyPictures[ Htid ].<br>- The number of pictures in the DPB is greater than or equal to max_dec_pic_buffering_minus1[ Htid ] + 1. |

For example, according to the VVC standard for a video/image coding system, before decoding a current picture (however, after parsing the slice header of the first slice of the current picture), a picture output process may be invoked once per picture as represented in the above table.

In addition, for example, referring to Table 1, when a current access unit (AU) is a coded video sequence start (CVSS) AU that is not AU 0, the following ordered steps may be applied.

First, a variable NoOutputOfPriorPicsFlag may be derived for a decoder under test as follows.

If each of the value of PicWidthMaxInSamplesY, PicHeightMaxInSamplesY, MaxChromaFormat, MaxBitDepthMinus8, or max_dec_pic_buffering_minus1[Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU in a decoding order, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag for the decoder under test may be applied to an HRD (hypothetical reference decoder). Accordingly, when the value of NoOutputOfPriorPicsFlag is 1, all picture storage buffers in the DPB may be emptied without output of the pictures which are contained, and the DPB fullness may be set equal to 0.

Furthermore, for example, referring to Table 1, when both of the following conditions are true for any pictures k in the DPB, all pictures k in the DPB may be removed from the DPB.

Picture k is marked as "unused for reference".

Picture k has PictureOutputFlag equal to 0 or the DPB output time of picture k is less than or equal to the CPB removal time of the first DU (denoted as DU m) of the current picture n; i.e., DpbOutputTime[k] is less than or equal to DuCpbRemovalTime[m].

Furthermore, for example, referring to Table 1, for each picture that is removed from the DPB, the DPB fullness may be decreased by one.

Furthermore, for example, referring to Table 1, when a current access unit (AU) is a coded video sequence start (CVSS) AU that is not AU 0, the following ordered steps may be applied.

First, a variable NoOutputOfPriorPicsFlag may be derived for a decoder under test as follows.

If each of the value of PicWidthMaxInSamplesY, PicHeightMaxInSamplesY, MaxChromaFormat, MaxBitDepthMinus8, or max_dec_pic_buffering_minus1 [Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU in a decoding order, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag for the decoder under test may be applied to an HRD (hypothetical reference decoder) as follows.

For example, when the value of NoOutputOfPriorPicsFlag is 1, all picture storage buffers in the DPB may be emptied without output of the pictures which are contained, and the DPB fullness may be set equal to 0.

Otherwise (i.e., when the value of NoOutputOfPriorPicsFlag is 0), all picture storage buffers containing a picture that is marked as "not needed for output" and "unused for reference" may be emptied (without output), and all non-empty picture storage buffers in the DPB may be emptied by repeatedly invoking the "bumping" process specified in clause C.5.2.4 (of the VVC standard) and the DPB fullness may be set equal to 0.

Meanwhile, the bumping process may include the following ordered steps.

1. The first output picture (or pictures) may be selected as a picture of which PicOrderCntVal value is the smallest among all pictures in the DPB marked as "needed for output".
2. Each of the pictures may be cropped in an ascending order of nuh_layer_id by using a conformance cropping window for the picture, and the cropped picture may be output and the picture may be marked as "not needed for output".
3. Each picture storage buffer including a picture which is one of the pictures marked as "not needed for output" and cropped and outputted may be emptied, and the DPB fullness may be decreased by 1.

Furthermore, for example, referring to Table 1, when a current access unit (AU) is a coded video sequence start (CVSS) AU that is not AU 0, all picture storage buffers containing a picture that is marked as "not needed for output" and "unused for reference" may be emptied (without output). For each of the picture storage buffers, the DPB fullness may be decreased by 1. Furthermore, when one or more of the following conditions are true, the "bumping" process specified in the clause C.5.2.4 (of the VVC standard) may be invoked repeatedly while further decrementing the DPB fullness by 1 for each additional picture storage buffer that is emptied until none of the following conditions are true.

The number of pictures in the DPB that are marked as "needed for output" is greater than max_num_reorder_pics[Htid].

max_latency_increase_plus1[Htid] is not equal to 0 and there is at least one picture in the DPB that is marked as "needed for output" for which the associated variable PicLatencyCount is greater than or equal to MaxLatencyPictures[Htid].

The number of pictures in the DPB is greater than or equal to max_dec_pic_buffering_minus1[Htid]+1.

Meanwhile, the conventional VVC standard for the picture output and removal process described above may have the following problems. That is, in the aspect of the associated process while decoding a current picture and the associated process after decoding the current picture, the conventional VVC standard for the operation of an output order of the DPB may have the following problems.

1. When emptying a picture buffer by invoking a bumping process, the DPB fullness should be decreased only once. However, in the conventional VVC standard, the DPB fullness is decreased twice. That is, the DPB fullness is decreased once during the bumping process and decreased once after the bumping process is completed.
2. When one of the conditions is true, there are three conditions for invoking the bumping process. However, for the three conditions, the check is already performed during an additional bumping process, and not all the three conditions are required. Here, as described above, the three conditions may be i) the number of pictures in the DPB that are marked as "needed for output" is greater than max_num_reorder_pics[Htid], ii) max_latency_increase_plus1[Htid] is not equal to 0 and there is at least one picture in the DPB that is marked as "needed for output" for which the associated variable PicLatencyCount is greater than or equal to MaxLatencyPictures[Htid], and iii) the number of pictures in the DPB is greater than or equal to max_dec_pic_buffering_minus1[Htid]+1.

The detailed description for the syntax elements max_num_reorder_pics[Htid], max_latency_increase_plus1 [Htid], and max_dec_pic_buffering_minus1[Htid] used for the three conditions will be described below.

Accordingly, the present disclosure proposes a solution for the problem described above. The proposed embodiments may be applied individually or in combination. That is, the present disclosure may be modified/applied as the following methods in relation to the output and removal of a picture from the DPB.

In one embodiment, for each decoded picture buffer emptied by invoking the bumping process, the DPB fullness may be decreased only once. The DPB decrement may be performed during the bumping process (i.e., by the bumping process itself) or performed after the bumping process is completed.

Furthermore, in one embodiment, the bumping process may be invoked when starting a picture decoding (i.e., before decoding the current picture, but after parsing the slice header of the first slice of the current picture) and/or after the picture decoding (i.e., when the last DU of AU n containing the current picture is removed from a CPB).

Furthermore, in one embodiment, after all picture storage buffers containing a picture that is marked as "not needed for output" and "unused for reference" are emptied (without output), the bumping process may be invoked in starting the picture decoding when the picture buffer of the DPB for storing the current picture is insufficient. This condition may be expressed as below, that is, expressed as "the number of pictures in the DPB is greater than or equal to max_dec_pic_buffering_minus1[Htid]+1".

Furthermore, in one embodiment, the bumping process may be invoked when the picture decoding is terminated in the case that at least one of the following conditions is satisfied.

i) The number of pictures in the DPB that are marked as "needed for output" is greater than max_num_reorder_pics[Htid].

ii) max_latency_increase_plus1 [Htid] is not equal to 0 and there is at least one picture in the DPB that is marked as "needed for output" for which the associated variable PicLatencyCount is greater than or equal to MaxLatencyPictures[Htid].

The embodiments described above may be implemented as represented in Table 2 below. In one example, Table 2 below represents the VVC standard specification that provides a part or all of the embodiments described above.

TABLE 2

...

C.5.2.2 Output and removal of pictures from the DPB

The output and removal of pictures from the DPB before the decoding of the current picture (but after parsing the slice header of the first slice of the current picture) happens instantaneously when the first DU of the AU containing the current picture is removed from the CPB and proceeds as follows:

- The decoding process for reference picture list construction as specified in clause 8.3.2 and decoding process for reference picture marking as specified in clause 8.3.3 are invoked.
- If the current picture is the first picture of the current AU and the current AU is a CVSS AU that is not AU 0, the following ordered steps are applied:
  1. The variable NoOutputOfPriorPicsFlag is derived for the decoder under test as follows:
     - If the value of PicWidthMaxInSamplesY, PicHeightMaxInSamplesY, MaxChromaFormat, MaxBitDepthMinus8, or max_dec_pic_buffering_minus_1[ Htid ] derived for the current AU is different from the value of PicWidthMaxInSamplesY, PicHeightMaxInSamplesY, MaxChromaFormat, MaxBitDepthMinus8, or max_dcc_pic_buffcring_minus1[ Htid ], respectively, derived for the preceding AU in decoding order, NoOutputOfPriorPicsFlag may (but should not) be set equal to 1 by the decoder under test, regardless of the value of ph_no_output_of_prior_pics_flag of the current AU.

TABLE 2-continued

| |
|---|
| NOTE - Although setting NoOutputOfPriorPicsFlag equal to ph_no_output_of_prior_pics_flag of the current AU is preferred under these conditions, the decoder under test is allowed to set NoOutputOfPriorPicsFlag equal to 1 in this case. |
| - Otherwise, NoOutputOfPriorPicsFlag is set equal to ph_no_output_of_prior_pics_flag of the current AU. |
| 2. The value of NoOutputOfPriorPicsFlag derived for the decoder under test is applied for the HRD as follows: |
| - If NoOutputOfPriorPicsFlag is equal to 1, all picture storage buffers in the DPB are emptied without output of the pictures they contain and the DPB fullness is set equal to 0. |
| - Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0. |
| - Otherwise (the current AU is not a CVSS AU or the current AU is a CVSS AU that is not AU 0 but the current picture is not the first picture of the current AU), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly, until the number of pictures in the DPB is not greater than or equal to max dec pic buffering minus1[ Htid ] + 1. |

For example, referring to Table 2, when a current picture is the first picture of a current AU and the current AU is a coded video sequence start (CVSS) AU that is not AU 0, the following ordered steps may be applied.

First, a variable NoOutputOfPriorPicsFlag may be derived for a decoder under test as follows.

If each of the value of PicWidthMaxInSamplesY, PicHeightMaxInSamplesY, MaxChromaFormat, MaxBitDepthMinus8, or max_dec_pic_buffering_minus1 [Htid] derived for the current AU is different from the value of PicWidthMaxInSamplesY, PicHeightMaxInSamplesY, MaxChromaFormat, MaxBitDepthMinus8, or max_dec_pic_buffering_minus1[Htid] derived for the preceding AU in a decoding order, NoOutputOfPriorPicsFlag may be set equal to 1 by the decoder under test regardless of the value of ph_no_output_of_prior_pics_flag of the current AU.

Otherwise, NoOutputOfPriorPicsFlag may be set equal to the value of ph_no_output_of_prior_pics_flag of the current AU.

Second, the variable NoOutputOfPriorPicsFlag for the decoder under test may be applied to an HRD (hypothetical reference decoder) as follows.

When the value of NoOutputOfPriorPicsFlag is 1, all picture storage buffers in the DPB may be emptied without output of the pictures which are contained, and the DPB fullness may be set equal to 0.

Otherwise (i.e., when the value of NoOutputOfPriorPicsFlag is 0), all picture storage buffers containing a picture that is marked as "not needed for output" and "unused for reference" may be emptied (without output), and all non-empty picture storage buffers in the DPB may be emptied by repeatedly invoking the "bumping" process specified in clause C.5.2.4 (of the VVC standard) and the DPB fullness may be set equal to 0.

In addition, for example, referring to Table 2, when a current picture is not the CVSS AU or the current AU is the CVSS AU that is not AU 0, but the current picture is not the first picture in the current AU, all picture storage buffers containing a picture that is marked as "not needed for output" and "unused for reference" may be emptied (without output). For each emptied picture storage buffer, the DPB fullness may be decreased by 1. Until the number of pictures in the DPB becomes not greater than or equal to max_dec_pic_buffering_minus1 [Htid]+1, the "bumping" process specified in the clause C.5.2.4 (of the VVC standard) may be invoked repeatedly.

According to the implementation of Table 2 described above, the operation of further decreasing the DPB fullness by 1 is removed for each additional picture storage buffer which is emptied in the invoking process of the bumping process, the DPB fullness may be decreased only once while outputting a picture and removing from the DPB.

In addition, according to the implementation of Table 2 described above, the invoking of the bumping process is restricted to the case of satisfying the condition based on max_dec_pic_buffering_minus1[Htid], and the unnecessary process of checking an overlapped condition is not required. That is, when invoking the bumping process, the existing condition based on max_num_reorder_pics[Htid] and max_latency_increase_plus1[Htid] may be an overlapped condition, it may be implemented that the two conditions are restricted not to be checked as a bumping process invoking related condition, and only the condition based on max_dec_pic_buffering_minus1[Htid] according to an embodiment of the present disclosure may be checked. Since the existing two conditions based on max_num_reorder_pics [Htid] and max_latency_increase_plus1[Htid] are already checked when decoding of the previous picture is ended (i.e., during the additional bumping process), the two conditions may be overlapped conditions when deciding the current picture. When the decoder starts decoding of the current picture, there is no change in the DPB in relation to the number of pictures marked as "needed for output". Therefore, since the two conditions already return false values until the additional bumping process of the previous picture is ended, the case of returning a true value does not occur. Consequently, it is not required to apply the two conditions for invoking the bumping process when decoding of the current picture is started.

In one embodiment, when the current picture is not the CVSS AU or the current AU is the CVSS AU that is not AU 0, but the current picture is not the first picture in the current AU, all picture storage buffers containing a picture that is marked as "not needed for output" and "unused for reference" may be emptied (without output). For each emptied picture storage buffer, the DPB fullness may be decreased by 1. Further, in invoking the bumping process, the bumping process may be invoked repeatedly until the number of pictures in the DPB becomes smaller than max_dec_pic_buffering_minus1[Htid]+1. However, in the case that the number of pictures in the DPB is smaller than max_dec_pic_buffering_minus1 [Htid]+1 (i.e., in the case that the number of pictures in the DPB is not greater than or equal to max_dec_pic_buffering_minus1[Htid]+1), even in the case that the case that the following conditions i) and/or ii) are not true is satisfied, the bumping process may not be invoked.

i) The number of pictures in the DPB that are marked as "needed for output" is greater than max_num_reorder_pics[Htid].

ii) max_latency_increase_plus1 [Htid] is not equal to 0, and there is at least one picture in the DPB that is marked as "needed for output" for which the associated variable PicLatencyCount is greater than or equal to MaxLatencyPictures[Htid].

That is, according to the method proposed in the present disclosure described above, the DPB fullness may be decreased only once when a picture buffer is emptied in a bumping process, and the accuracy of an output order operation of the DPB may be improved. Further, the number of invoke condition check numbers of the bumping process is decreased, and complexity may be decreased. Accordingly, the accuracy and efficiency may be improved in a DPB management (i.e., output and removal operation of a picture in a DPB).

Figure 4:
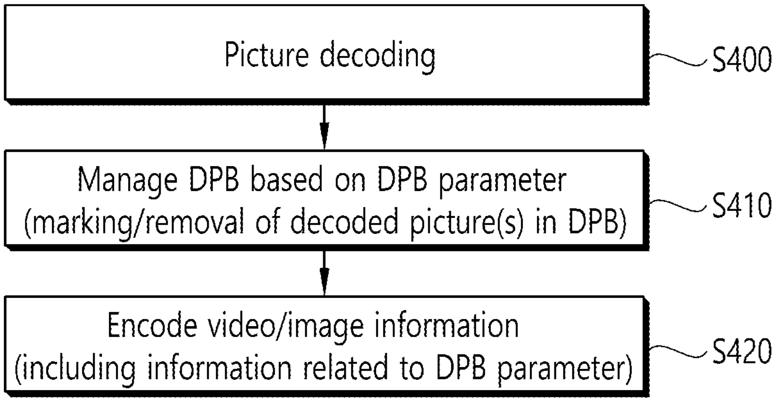
FIG. 4 illustrates an encoding procedure according to an embodiment of the present disclosure.

FIG. 4 illustrates an encoding procedure according to an embodiment of the present disclosure. The method shown in FIG. 4 may be performed by the encoding apparatus 200 shown in FIG. 2. In addition, one or more steps shown in FIG. 4 may be omitted, and a certain step may be added according to an embodiment.

Referring to FIG. 4, the encoding apparatus decodes (reconstructs) a picture (step S400). The encoding apparatus may decode a picture of a current AU.

The encoding apparatus manages a DPB based on a DPB parameter (step S410). Here, the DPB management may also be called a DPB update. The DPB management process may include a marking process and/or a removal process of the picture decoded in the DPB. The decoded picture may be used as references for an inter prediction of a subsequent picture. That is, the decoded picture may be used as a reference picture of an inter prediction of a subsequent picture in a decoding order. Basically, each decoded picture may be inserted into the DPB. In addition, the DPB may be updated before decoding a current picture generally. In the case that a layer associated with the DPB is not an output layer (or the DPB parameter is not in relation to the output layer) but a reference layer, the decoded picture in the DPB may not be outputted. In the case that a layer associated with the DPB (or the DPB parameter) is an output layer, the decoded picture in the DPB may be outputted based on the DPB and/or the DPB parameter. The DPB management may include an operation of outputting the decoded picture from the DPB.

The encoding apparatus encodes image information including information related to the DPB parameter (step S420). The information related to the DPB parameter may include information/syntax element disclosed in the embodiments described above and/or the syntax element represented in the following table.

TABLE 3

| | Descriptor |
|---|---|
| video_parameter_set_rbsp( ) { | |
| ... | |
| if( !vps_all_independent_layers_flag ) | |
| vps_num_dpb_params | ue(v) |
| if( vps_num_dpb_params > 0 ) { | |
| same_dpb_size_output_or_nonoutput_flag | u(1) |
| if( vps_max_sublayers_minus1 > 0 ) | |
| vps_sublayer_dpb_params_present_flag | u(1) |
| } | |
| for( i = 0; i < vps_num_dpb_params; i++ ) { | |
| dpb_size_only_flag[ i ] | u(1) |
| if( vps_max_sublayers_minus1 > 0 && !vps_all_layers_same_num_sublayers_flag ) | |
| dpb_max_temporal_id[ i ] | u(3) |
| dpb_parameters( dpb_size_only_flag[ i ], dpb_max_temporal_id[ i ], vps_sublayer_dpb_params_present flag ) | |
| } | |
| for( i = 0; i < vps_max_layers_minus1 && vps_num_dpb_params > 1; i++ ) { | |
| if( !vps_independent_layer_flag[ i ] ) | |
| layer_output_dpb_params_idx[ i ] | ue(v) |
| if( LayerUsedAsRefLayerFlag[ i ] && !same_dpb_size_output_or_non output_flag ) | |
| layer_nonoutput_dpb_params_idx[ i ] | ue(v) |
| } | |
| ... | |
| } | |

For example, Table 3 above may represent a video parameter set (VPS) that includes syntax elements for the DPB parameter which is signaled.

The semantics for the syntax elements represented in Table 3 above may be as follows.

TABLE 4 vps_num_dpb_params specifies the number of dpb_parameters( ) syntax strutcures in the VPS. The value of vps_num_dpb_params shall be in the range of 0 to 16, inclusive. When not present, the value of vps_num_dpb_params is inferred to be equal to 0.

same_dpb_size_output_or_nonoutput_flag equal to 1 specifies that there is no layer_nonoutput_dpb_params_idx[ i ] syntax element present in the VPS. same_dpb_size_output_or_nonoutput_flag equal to 0 specifies that there may or may not be layer_nonoutput_dpb_params_idx[ i ] syntax elements present in the VPS.

vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax strucures in the VPS. When not present, vps_sub_dpb_params_info_present_flag is inferred to be equal to 0.

dpb_size_only_flag[ i ] equal to 1 specifics that the max_num_rcordcr_pics[ ] and max_latency_increase_plus1[ ] syntax elements are not present in the i-th TABLE 4-continued

| |
|---|
| dpb_parameters( ) syntax strucures the VPS. dpb_size_only_flag[ i ] equal to 0 specifies that the max_num_reorder_pics[ ] and max_latency_increase_plus1[ ] syntax elements may be present in the i-th dpb_parameters( ) syntax strucures the VPS.<br>dpb_max_temporal_id[ i ] specifies the TemporalId of the highest sublayer representation for which the DPB parameters may be present in the i-th dpb_parameters( ) syntax strutcure in the VPS. The value of dpb_max_temporal_id[ i ] shall be in the range of 0 to vps_max_sublayers_minus1, inclusive. When vps_max_sublayers_minus1 is equal to 0, the value of dpb_max_temporal_id[ i ] is inferred to be equal to 0. When vps_max_sublayers_minus1 is greater than 0 and vps_all_layers_same_num_sublayers_flag is equal to 1, the value of dpb_max_temporal_id[ i ] is inferred to be equal to vps_max_sublayers_minus1.<br>layer_output_dpb_params_idx[ i ] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[ i ] shall be in the range of 0 to vps num_dpb_params − 1, inclusive.<br>If vps_independent_layer flag[ i ] is equal to 1, the dpb_parameters( ) syntax structure that applies to the i-th layer when it is an output layer is the dpb_parameters( ) syntax structure present in the SPS referred to by the layer.<br>Otherwise (vps_independent_layer_flag[ i ] is equal to 0), the following applies:<br>- When vps_num_dpb_params is equal to 1, the value of layer_output_dpb_params_idx[ i ] is inferred to be equal to 0.<br>- It is a requirement of bitstream conformance that the value of layer_output_dpb_params_idx[ i ] shall be such that dpb_size_only_flag[ layer output dpb params idx[ i ] ] is equal to 0.<br>layer_nonoutput_dpb_params_idx[ i ] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[ i ] shall be in the range of 0 to vps_num_dpb_params − 1, inclusive.<br>If same dpb_size_output_or_nonoutput_flag is equal to 1, the following applies:<br>- If vps_independent_layer_flag[ i ] is equal to 1, the dpb_parameters( ) syntax structure that applies to the i-th layer when it is a non-output layer is the dpb_parameters( ) syntax structure present in the SPS referred to by the layer.<br>- Otherwise (vps_independent_layer_flag[ i ] is equal to 0), the value of layer_nonoutput_dpb_params_idx[ i ] is inferred to be equal to layer_output_dpb_params_idx[ i ].<br>Otherwise (same_dpb_size_output_or_nonoutput_flag is equal to 0), when vps_num_dpb_params is equal to 1, the value of layer_output_dpb_params_idx[ i ] is inferred to be equal to 0. |

For example, the syntax element vps_num_dpb_params may represent the number of dpb_parameters( ) syntax structures in the VPS. For example, a value of vps_num_dpb_params may be in a range of 0 to 16. Furthermore, in the case that the syntax element vps_num_dpb_params is not present, a value of the syntax element vps_num_dpb_params may consider to be 0.

In addition, for example, the syntax element same_dpb_size_output_or_nonoutput_flag may represent whether the syntax element layer_nonoutput_dpb_params_idx[i] may be present in the VPS. For example, in the case that a value of the syntax element same_dpb_size_output_or_nonoutput_flag is 1, the syntax element same_dpb_size_output_or_nonoutput_flag may represent that the syntax element layer_nonoutput_dpb_params_idx[i] is not present in the VPS, in the case that a value of the syntax element same_dpb_size_output_or_nonoutput_flag is 0, the syntax element same_dpb_size_output_or_nonoutput_flag may represent that the syntax element layer_nonoutput_dpb_params_idx[i] may be present.

In addition, for example, the syntax element vps_sublayer_dpb_params_present_flag may be used to control the presence of the syntax elements max_dec_pic_buffering_minus1[ ], max_num_reorder_pics[ ] and max_latency_increase_plus1 [ ] in dpb_parameters( ) syntax structure of the VPS. Furthermore, in the case that the syntax element vps_sublayer_dpb_params_present_flag is not present, a value of the syntax element vps_sublayer_dpb_params_present_flag may consider to be 0.

In addition, for example, the syntax element dpb_size_only_flag[i] may represent whether the syntax elements max_num_reorder_pics[ ] and max_latency_increase_plus1[ ] may be present in the i-th dpb_parameters( ) syntax structure of VPS. For example, in the case that a value of the syntax element dpb_size_only_flag[i] is 1, the syntax element dpb_size_only_flag[i] may represent that the syntax elements max_num_reorder_pics[ ] and max_latency_increase_plus1[ ] is not present in the i-th dpb_parameters( ) syntax structure of VPS, and in the case that a value of the syntax element dpb_size_only_flag[i] is 0, the syntax element dpb_size_only_flag[i] may represent that the syntax elements max_num_reorder_pics[ ] and max_latency_increase_plus1 [ ] may be present in the i-th dpb_parameters ( ) syntax structure of VPS.

In addition, for example, the syntax element dpb_max_temporal_id[i] may represent TemporalId of the highest sublayer representation in which a DPB parameter may be present in the i-th dpb_parameters( ) syntax structure of the VPS. Furthermore, a value of dpb_max_temporal_id[i] may be in a range of 0 to vps_max_sublayers_minus1. In addition, for example, in the case that a value of vps_max_sublayers_minus1 is 0, a value of dpb_max_temporal_id[i] may be considered to be 0. Furthermore, for example, in the case that a value of vps_max_sublayers_minus1 is greater than 0 and a value of vps_all_layers_same_num_sublayers_flag is 1, a value of dpb_max_temporal_id[i] may be considered to be equal to vps_max_sublayers_minus1.

In addition, for example, the syntax element layer_output_dpb_params_idx[i] may designate an index of the dpb_parameters( ) syntax structure applied to the i-th layer which is an output layer of OLS to a list of dpb_parameters ( ) syntax structure of VPS. In the case that the syntax element layer_output_dpb_params_idx[i] is present, a value of the syntax element layer_output_dpb_params_idx[i] may be in a range of 0 to vps_num_dpb_params−1.

For example, in the case that vps_independent_layer_flag [i] is 1, this may be a dpb_parameters( ) syntax structure present in the SPS referenced in the dpb_parameters( ) syntax structure layer applied to the i-th layer which is an output layer.

Alternatively, for example, in the case that vps_independent_layer_flag[i] is 0, the following description may be applied.

In the case that vps_num_dpb_params is 0, a value of layer_output_dpb_params_idx[i] may consider to be 0.

A value of layer_output_dpb_params_idx[i] may be a requirement of bitstream conformance such that a value of dpb_size_only_flag[layer_output_dpb_params_idx [i]] becomes 0.

In addition, for example, the syntax element layer_nonoutput_dpb_params_idx[i] may designate an index of the dpb_parameters( ) syntax structure applied to the i-th layer which is a non-output layer of OLS to a list of the dpb_parameters( ) syntax structure of VPS. In the case that the syntax element layer_nonoutput_dpb_params_idx[i] is present, a value of the syntax element layer_nonoutput_dpb_params_idx[i] may be in a range of 0 to vps_num_dpb_params−1.

For example, in the case that same_dpb_size_output_or_nonoutput_flag is 1, the following description may be applied.

In the case that vps_independent_layer_flag[i] is 1, this may be the dpb_parameters( ) syntax structure present in SPS referenced in the dpb_parameters( ) syntax structure layer applied to the i-th layer which is a non-output layer.

In the case that vps_independent_layer_flag[i] is 0, a value of layer_nonoutput_dpb_params_idx[i] may be considered to be equal to layer_output_dpb_params_idx[i].

Alternatively, for example, in the case that same_dpb_size_output_or_nonoutput_flag is 0, when vps_num_dpb_params is 1, a value of layer_output_dpb_params_idx [i] may considered to be 0.

On the other hand, for example, the dpb_parameters( ) syntax structure that is the DPB parameter syntax structure disclosed in Table 3 may be as follows.

TABLE 5

| | Descriptor |
|---|---|
| dpb_parameters( dpbSizeOnlyFlag, maxSubLayersMinus1, subLayerInfoFlag ) { | |
| for( i = ( subLayerInfoFlag ? 0 : maxSubLayersMinus1 ); | |
| i <= maxSubLayersMinus1; i++ ) { | |
| max_dec_pic_buffering_minus1[ i ] | ue(v) |
| if( !dpbSizeOnlyFlag ) { | |
| max_num_reorder_pics[ i ] | ue(v) |
| max_latency_increase_plus1[ i ] | ue(v) |
| } | |
| } | |
| } | |

Referring to Table 5, the dpb_parameters( ) syntax structure may provide information of a DPB size of each CLVS of the CVS, the maximum picture reorder number, and the maximum latency. The dpb_parameters( ) syntax structure may be represented as information of a DPB parameter or DPB parameter information.

In the case that the VPS includes the dpb_parameters( ) syntax structure, the OLS to which the dpb_parameters( ) syntax structure is applied may be designated by the VPS. In addition, in the case that the SPS includes the dpb_parameters( ) syntax structure, the dpb_parameters( ) syntax structure may be applied to the OLS including only the lowest layer among the layers referring to the SPS.

The semantics for the syntax elements represented in Table 5 described above may be as follows.

TABLE 6 max_dec_pic_buffering_minus1[ i ] plus 1 specifies, for each for each CLVS of the CVS, the maximum required size of the DPB in units of picture storage buffers when Htid is equal to i. The value of max_dec_pic_buffering_minus1[ i ] shall be in the range of 0 to MaxDpbSize − 1, inclusive, where MaxDpbSize is as specified in clause A.4.2. When i is greater than 0, max_dec_pic_buffering_minus1[ i ] shall be greater than or equal to max_dec_pic_buffering_minus1[ i − 1 ]. When max_dec_pic_buffering_minus1[ i ] is not present for i in the range of 0 to maxSubLayersMinus1 − 1, inclusive, due to subLayerInfoFlag being equal to 0, it is inferred to be equal to max_dec_pic_buffering_minus1[ maxSubLayersMinus1 ].
max_num_reorder_pics[ i ] specifies, for each CLVS of the CVS, the maximum allowed number of pictures of the CLVS that can precede any picture in the CLVS in decoding order and follow that picture in output order when Htid is equal to i. The value of max_num_reorder_pics[ i ] shall be in the range of 0 to max_dec_pic_buffering_minus1[ i ], inclusive. When i is greater than 0, max_num_reorder_pics[ i ] shall be greater than or equal to max_num_reorder_pics[ i − 1 ]. When max_num_reorder_pics[ i ] is not present for i in the range of 0 to maxSubLayersMinus1 − 1, inclusive, due to subLayerInfoFlag being equal to 0, it is inferred to be equal to max_num_reorder_pics[ maxSubLayersMinus1 ].
max_latency_increase_plus1[ i ] not equal to 0 is used to compute the value of MaxLatencyPictures[ i ], which specifies, for each CLVS of the CVS, the maximum number of pictures in the CLVS that can precede any picture in the CLVS in output order and follow that picture in decoding order when Htid is equal to i.
When max_latency_increase_plus1[ i ] is not equal to 0, the value of MaxLatencyPictures[ i ] is specified as follows:
MaxLatencyPictures[ i ]=
max_num_reorder_pics[ i ] + max_latency_increase_plus1[ i ] − 1 (7-73)
When max_latency_increase_plus1[ i ] is equal to 0, no corresponding limit is expressed.

TABLE 6-continued

| |
|---|
| The value of max_latency_increase_plus1[ i ] shall be in the range of 0 to $2^{32}-2$, inclusive. When max_latency_increase_plus1[ i ] is not present for i in the range of 0 to maxSubLayersMinus1 − 1, inclusive, due to subLayerInfoFlag being equal to 0, it is inferred to be equal to max_latency_increase_plus1[ maxSubLayersMinus1 ]. |

For example, a value of the syntax element max_dec_pic_buffering_minus1[i] plus 1 may represent a maximum required size of the DPB in a unit of a picture storage buffer when Htid is equal to i for each CLVS of the CVS. For example, max_dec_pic_buffering_minus1 [i] may be information for a DPB size. For example, a value of the syntax element max_dec_pic_buffering_minus1[i] may be in a range of 0 to MaxDpbSize−1. In addition, for example, in the case that i is greater than 0, max_dec_pic_buffering_minus1[i] may be greater than or equal to max_dec_pic_buffering_minus1[i−1]. Furthermore, for example, in the case that max_dec_pic_buffering_minus1[i] is not present for i in the range of 0 to maxSubLayersMinus1-1, since subLayerInfoFlag is equal to 0, a value of the syntax element max_dec_pic_buffering_minus1[i] may be considered to be equal to max_dec_pic_buffering_minus1[maxSubLayersMinus1].

In addition, for example, the syntax element max_num_reorder_pics[i] may precede for all pictures of the CLVS in a decoding order for each CLVS of the CVS and may represent the maximum allowed number of the picture of the CLVS that may follow corresponding picture in an output order when Htid is equal to i. For example, max_num_reorder_pics[i] may be information of the maximum picture reorder number of DPB. A value of max_num_reorder_pics [i] may be in a range of 0 to max_dec_pic_buffering_minus1 [i]. Furthermore, for example, in the case that i is greater than 0, max_num_reorder_pics[i] may be greater than or equal to max_num_reorder_pics[i−1]. In addition, for example, in the case that max_num_reorder_pics[i] is not present for i in the range of 0 to maxSubLayersMinus1-1, since subLayerInfoFlag is 0, the syntax element max_num_reorder_pics[i] may be considered to be equal to max_num_reorder_pics[maxSubLayersMinus1].

In addition, for example, the non-zero synatax element max_latency_increase_plus1 [i] may be used to calculate a value of MaxLatencyPictures[i]. The MaxLatencyPictures [i] may precede for all pictures of the CLVS in an output order for each CLVS of the CVS and may follow corresponding picture in a decoding order when Htid is equal to i. For example, max_latency_increase_plus1[i] may be information of the maximum latency of DPB.

For example, in the case that max_latency_increase_plus1 [i] is not 0, a value of MaxLatencyPictures[i] may be derived as represented in the following equation.

$$\text{MaxLatencyPictures}[i]=\text{max\_num\_reorder\_pics}[i]+\text{max\_latency\_increase\_plus1}[i]-1 \quad \text{[Equation 1]}$$

Meanwhile, for example, in the case that max_latency_increase_plus1 [i] is 0, the restriction may not be represented. A value of max_latency_increase_plus1[i] may be in the range of 0 to $2^{32}-2$. Furthermore, for example, in the case that max_latency_increase_plus1 [i] is not present for i within a range of 0 to maxSubLayersMinus1−1, since subLayerInfoFlag is 0, the syntax element max_latency_increase_plus1[i] may be considered to be equal to max_dec_pic_buffering_minus1[maxSubLayersMinus1].

The DPB management may be performed based on the information related to the DPB parameter/syntax element. Different DPB parameter(s) may be signaled depending on whether the current layer is an output layer or a referenced layer, or different DPB parameter(s) may be signaled based on whether the DPB (or DPB parameter) is for the OLS (whether the OLS mapping is applied).

Meanwhile, although it is not shown in FIG. 4, the encoding apparatus may decode the current picture based on the updated/managed DPB. Furthermore, the decoded current picture may be inserted into the DPB, the DPB including the decoded current picture may be updated based on the DPB parameter before decoding the next picture of the current picture in the decoding order.

Figure 5:
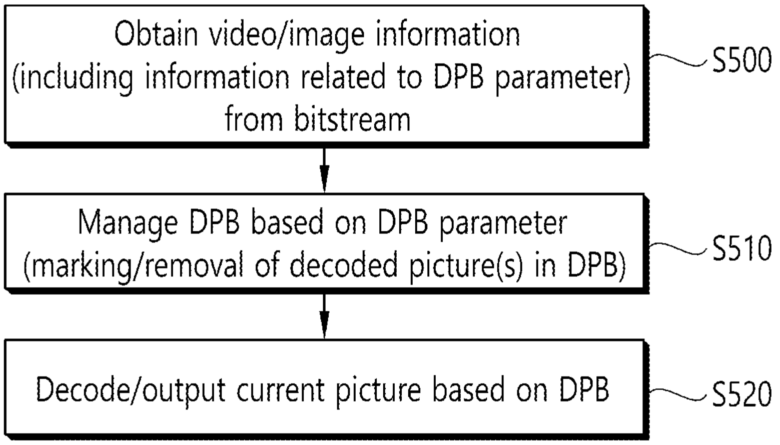
FIG. 5 illustrates a decoding procedure according to an embodiment of the present disclosure.

FIG. 5 illustrates a decoding procedure according to an embodiment of the present disclosure. The method disclosed in FIG. 5 may be performed by the decoding apparatus 300 disclosed in FIG. 3. In addition, one or more steps shown in FIG. 5 may be omitted, and depending on an embodiment, a different step may be added.

Referring to FIG. 5, the decoding apparatus obtains image information including information related to a DPB parameter from a bitstream (step S500). The decoding apparatus may obtain the information including information related to a DPB parameter. The information/syntax element related to a DPB parameter may be as described above.

The decoding apparatus manages the DPB based on the DPB parameter (step S510). Here, the DPB management may also be called a DPB update. The DPB management process may include a marking and/or removing process of a picture decoded in the DPB. The decoding apparatus may derive the DPB parameter based on the information related to a DPB parameter and may perform the DPB management process based on the derived DPB parameter.

The decoding apparatus decodes/outputs a current picture based on the DPB (step S520). The decoding apparatus may decode the current picture based on the updated/managed DPB. For example, based on an inter prediction in which the (previously) decoded picture in the DPB is used as a reference picture, a block/slice in the current picture may be decoded.

The following drawing is depicted to describe a detailed example of the present disclosure. The name of a specific apparatus shown in the drawing, a specific terminology or name (e.g., the name of syntax/syntax element, etc.) is presented as an example, and the technical feature of the present disclosure is not limited to the specific name used in the drawing below.

Figure 6:
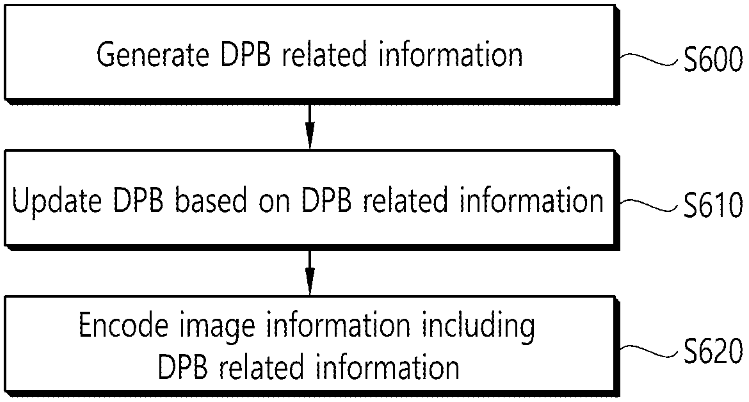
FIGS. 6 and 7 schematically illustrate a video/image encoding method and an example of related components according to embodiment(s) of the present document.
Figure 7:
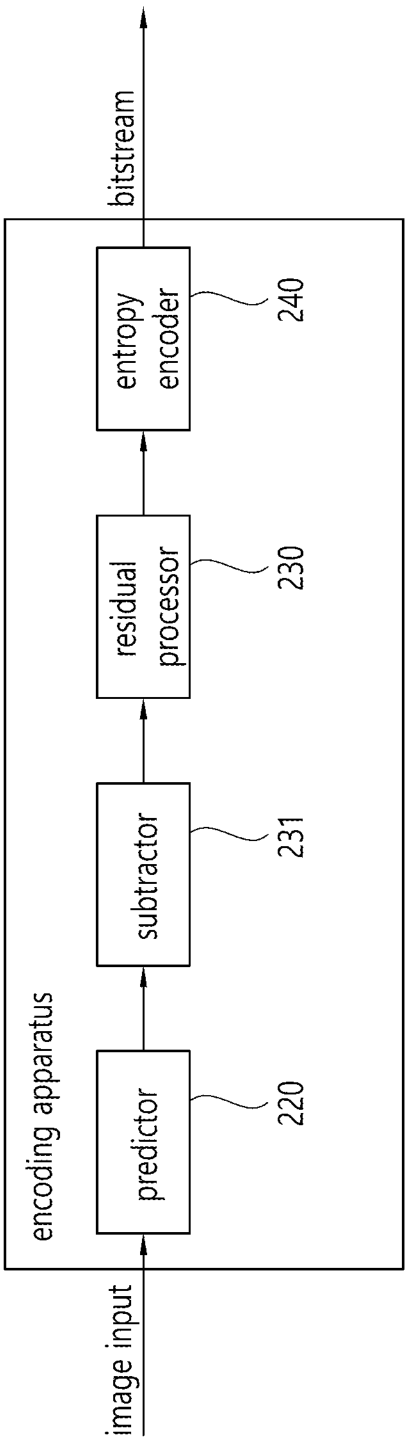

FIGS. 6 and 7 schematically illustrate a video/image encoding method and an example of the related component according to an embodiment(s) of the present disclosure.

The method disclosed in FIG. 6 may be performed by the encoding apparatus 200 disclosed in FIG. 2 or FIG. 7. Here, the encoding apparatus 200 disclosed in FIG. 7 schematically shows the encoding apparatus 200 disclosed in FIG. 2. Particularly, for example, steps S600 and S610 shown in FIG. 6 may be performed by the DPB shown in FIG. 2, and step S620 may be performed by the entropy encoder 240 shown in FIG. 2. In addition, although it is not shown in the drawing, a process of decoding a current picture may be performed by the predictor 220, the residual processor 230, the adder 340, and the like. Furthermore, the method disclosed in FIG. 6 may be performed by the embodiments of the present disclosure. Accordingly, the detailed description overlapped with the description described with referring to FIG. 6 is omitted or briefly described.

Referring to FIG. 6, the encoding apparatus may generate decoded picture buffer (DPB) related information (step S600).

The DPB related information may include at least one of a syntax element related to a maximum required size of the DPB, a syntax element related to a maximum picture reorder number of the DPB, or a syntax element related to maximum latency of the DPB.

For example, the syntax element related to a maximum required size of the DPB may be the syntax element max_dec_pic_buffering_minus1 [i] described above. In this case, a value of max_dec_pic_buffering_minus1[i] plus 1 may represent a maximum required size of the DPB as a unit of a picture storage buffer when Htid is equal to i. The syntax element related to a maximum picture reorder number of the DPB may be the syntax element max_num_reorder_pics[i] described above. In this case, max_num_reorder_pics[i] may be preceding for all pictures of CLVS in a decoding order for each CLVS of CVS and may represent the maximum allowed number of pictures of CLVS that may follow the corresponding picture in an output order when Htid is equal to i. The syntax element related to maximum latency of the DPB may be the syntax element max_latency_increase_plus1 [i] described above. In this case, max_latency_increase_plus1 [i] of which the value is not zero may be used to calculate a value of MaxLatencyPictures[i]. MaxLatencyPictures[i] may be preceding for all pictures of the CLVS in an output order for each CLVS of the CVS and may represent the maximum allowed number of pictures of the CLVS that may follow the corresponding picture in a decoding order when Htid is equal to i. For example, a value of MaxLatencyPictures[i] may be derived by (a value of the syntax element related to a maximum picture reorder number of the DPB+a value of the syntax element related to maximum latency of the DPB−1) and may be calculated as represented in Equation 1 described above.

Furthermore, the DPB related information may further include various types of information in relation to the output/removal of a picture in the DPB, for example, the information/syntax element related to the DPB parameter represented in Table 3 to Table 6 described above.

The encoding apparatus may update the DPB based on the DPB related information (step S610). The encoding apparatus may update (i.e., mark/remove/output the picture in the DPB) the DPB before decoding the current picture and after generating/encoding a slice header for the current picture. The DPB may include a picture which is decoded before the current picture.

To update (i.e., mark/remove/output the picture in the DPB) the DPB, the encoding apparatus may perform a bumping process for the DPB (i.e., the picture storage buffer in the DPB) based on the DPB related information and perform an operation of reducing the DPB fullness.

In one embodiment, the encoding apparatus may invoke the bumping process based on the case of satisfying the first condition in which the number of pictures in the DPB is not greater than or equal to a value of the syntax element related to a maximum required size of the DPB (e.g., max_dec_pic_buffering_minus1[i]) plus 1.

In addition, the invoking of the bumping process may not be determined based on the second condition based on the syntax element (e.g., max_num_reorder_pics) related to a maximum picture reorder number of the DPB or the third condition based on the syntax element (e.g., max_latency_increase_plus1) related to maximum latency of the DPB. In other words, in the case that the second condition or the third condition is satisfied but the first condition is not satisfied, the encoding apparatus may not perform the operation of invoking the bumping process.

Here, the second condition may be a condition related to whether the number of pictures in the DPB marked as "needed for output" is greater than a value of the syntax element (e.g., max_num_reorder_pics) related to a maximum picture reorder number of the DPB. The third condition may be a condition related to whether a value of the syntax element (e.g., max_latency_increase_plus1) related to maximum latency of the DPB is not equal to 0, and whether there is at least one picture in the DPB marked as "needed for output" for which the associated variable PicLatencyCount is greater than or equal to MaxLatencyPictures [Htid]. MaxLatencyPictures[i] may be derived by (a value of the syntax element related to a maximum picture reorder number of the DPB+a value of the syntax element related to maximum latency of the DPB−1).

That is, in invoking the bumping process, as described above, since the second condition and the third condition are already examined when decoding of the previous picture is ended (i.e., during an additional bumping process), the second condition and the third condition may be redundant conditions in decoding the current picture. Accordingly, the bumping process may be performed by determining whether only the first condition is satisfied, not based on the second condition and the third condition that are redundant conditions (i.e., excluding the second condition and the third condition). As a particular example, in the case that the first condition based on the case that the number of pictures in the DPB is smaller than max_dec_pic_buffering_minus1[i])+1 (i.e., the number of pictures in the DPB is not greater than or equal to max_dec_pic_buffering_minus1[i])+1) is not satisfied, even in the case that the case that the following conditions i) and/or ii) are not true is satisfied, the bumping process may not be invoked.

i) The number of pictures in the DPB that are marked as "needed for output" is greater than max_num_reorder_pics[Htid].

ii) max_latency_increase_plus1 [Htid] is not equal to 0 and there is at least one picture in the DPB that is marked as "needed for output" for which the associated variable PicLatencyCount is greater than or equal to MaxLatencyPictures[Htid].

In addition, in one embodiment, the encoding apparatus may decrease the DPB fullness by 1 for the picture storage buffer that is emptied in the DPB during the bumping process that is invoked based on the case that the first condition is satisfied. In other words, after the bumping process invoked based on the case that the first condition is satisfied is performed, the encoding apparatus does not additionally perform the operation of decreasing the DPB fullness by 1 for the picture storage buffer that is emptied in the DPB during the bumping process. In one example, as described in Table 2 above, the additional operation of decreasing the DPB fullness by 1 for each additional picture storage buffer that is emptied may be removed from the invoking operation of the bumping process. In this case, the bumping process is invoked until the number of pictures in the DPB is not greater than or equal to max_dec_pic_buffering_minus1[Htid]+1 (i.e., the case that the first condition is satisfied), and the DPB fullness may be decreased once only within the invoked bumping process operation. Since the detailed operation process of the bumping process is as described above, the description is omitted here.

In addition, in one embodiment, the encoding apparatus may determine whether the bumping process is invoked based on whether the current picture is the first picture of the current access unit (AU) that is a coded video sequence start (CVSS) access unit (AU) that is not AU 0. Here, AU 0 may designate the first AU of a bitstream, for example, AU 0 may be the first AU of a bitstream in a decoding order. In one example, as described in Table 2 above, in the case that the current AU is not a CVSS AU or in the case that the current AU is a CVSS AU that is not AU 0 but the current picture is not the first picture in the current AU, all picture storage buffers including a picture marked as "not needed for output" and "unused for reference" may be emptied (without an output). For each emptied picture storage buffer, the DPB fullness may be decreased by 1. Until the number of pictures in the DPB is not greater than or equal to max_dec_pic_buffering_minus1[Htid]+1, the bumping process may be repeatedly invoked.

That is, as described above, the encoding apparatus may perform removal and/or output a picture(s) in the DPB through an operation such as the bumping process based on the DPB related information and may update the DPB.

The encoding apparatus may encode image information including the DPB related information (step S620). In one embodiment, the encoding apparatus may encode the image information including at least one of the syntax element related a maximum required size of the DPB, the syntax element related a maximum picture reorder number of the DPB, or the syntax element related maximum latency of the DPB. Furthermore, the encoding apparatus may encode the image information including a slice header for the current picture.

Meanwhile, although it is not shown, the encoding apparatus may decode the current picture based on the updated DPB. For example, the encoding apparatus may derive a prediction sample by performing an inter prediction for a block in the current picture based on a reference picture of the DPB and may generate a reconstructed sample and/or a reconstructed picture for the current picture based on the prediction sample. Meanwhile, for example, the encoding apparatus may derive a residual sample for a block in the current picture and may generate a reconstructed sample and/or a reconstructed picture through an addition of the prediction sample and the residual sample. Later, as occasion demands, in order to improve subjective/objective image quality, the in-loop filtering process such as deblocking filtering, an SAO and/or ALF process may be applied to the reconstructed samples as described above. The encoding apparatus may generate/encode prediction related information and/or residual information for the block, and the image information may include the prediction related information and/or the residual information. Furthermore, the encoding apparatus may insert the decoded current picture into the DPB. In addition, for example, the encoding apparatus may derive a DPB parameter for the current AU and generate the DPB related information for the DPB parameter. The image information may include the DPB related information.

The image/video information including the various types of information described above may be encoded and outputted in a bitstream format. The bitstream may be transmitted to the decoding apparatus through a network or a (digital) storage medium. Here, the network may include a broadcasting network and/or a communication network, and the digital storage medium may include various storage media such as USB, SD, CD, DVD, Blu-ray, HDD, SSD, and the like.

Figure 8:
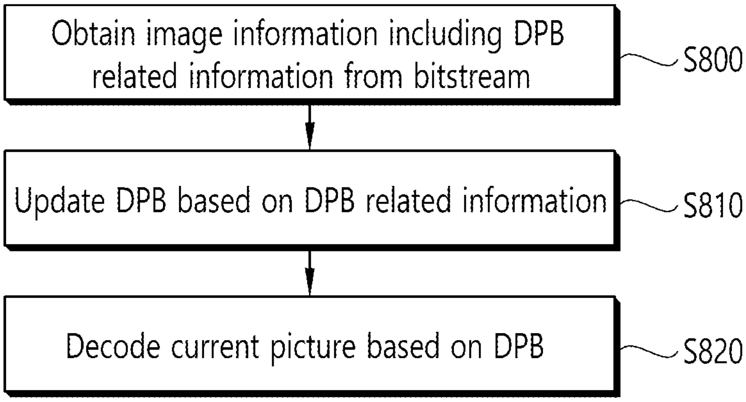
FIGS. 8 and 9 schematically illustrate a video/image decoding method and an example of related components according to embodiment(s) of the present document
Figure 9:
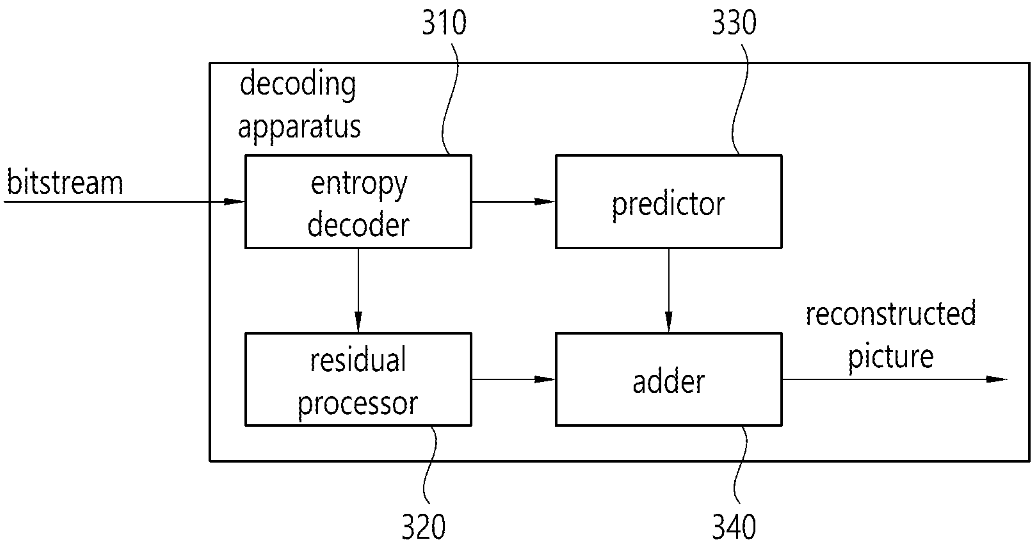

FIGS. 8 and 9 schematically illustrate a video/image decoding method and an example of the related component according to an embodiment(s) of the present disclosure.

The method disclosed in FIG. 8 may be performed by the decoding apparatus 300 disclosed in FIG. 3 or FIG. 9. Here, the decoding apparatus 300 disclosed in FIG. 9 schematically shows the decoding apparatus 300 disclosed in FIG. 3. Particularly, step S800 shown in FIG. 8 may be performed by the entropy decoder 310 shown in FIG. 3, and step S810 may be performed by the DPB shown in FIG. 3. In addition, step S820 may be performed by the entropy decoder 310, the residual processor 320, the predictor 330, the adder 340, and the like. Furthermore, the method disclosed in FIG. 8 may be performed by the embodiments of the present disclosure. Accordingly, the detailed description overlapped with the description described with referring to FIG. 8 is omitted or briefly described.

Referring to FIG. 8, the decoding apparatus may obtain image information including Decoded Picture Buffer (DPB) related information from a bitstream (step S800).

The DPB related information may include at least one of a syntax element related to a maximum required size of the DPB, a syntax element related to a maximum picture reorder number of the DPB, or a syntax element related to maximum latency of the DPB.

For example, the syntax element related to a maximum required size of the DPB may be the syntax element max_dec_pic_buffering_minus1 [i] described above. In this case, a value of max_dec_pic_buffering_minus1[i] plus 1 may represent a maximum required size of the DPB as a unit of a picture storage buffer when Htid is equal to i. The syntax element related to a maximum picture reorder number of the DPB may be the syntax element max_num_reorder_pics[i] described above. In this case, max_num_reorder_pics[i] may be preceding for all pictures of the CLVS in a decoding order for each CLVS of the CVS and may represent the maximum allowed number of pictures of the CLVS that may follow the corresponding picture in an output order when Htid is equal to i. The syntax element related to maximum latency of the DPB may be the syntax element max_latency_increase_plus1[i] described above. In this case, max_latency_increase_plus1[i] of which value is non-zero may be used to calculate a value of MaxLatencyPictures[i]. MaxLatencyPictures[i] may be preceding for all pictures of the CLVS in an output order for each CLVS of the CVS and may represent the maximum allowed number of pictures of the CLVS that may follow the corresponding picture in a decoding order when Htid is equal to i. For example, a value of MaxLatencyPictures[i] may be derived by (a value of the syntax element related to a maximum picture reorder number of the DPB+a value of the syntax element related to maximum latency of the DPB−1) and may be calculated as represented in Equation 1 described above.

Furthermore, the DPB related information may further include various types of information in relation to the output/removal of a picture in the DPB, for example, the information/syntax element related to the DPB parameter represented in Table 3 to Table 6 described above.

The decoding apparatus may update the DPB based on the DPB related information (step S810). The decoding apparatus may update (i.e., mark/remove/output the picture in the DPB) the DPB before decoding the current picture and after parsing a slice header of the first slice of the current picture. The DPB may include a picture which is decoded before the current picture.

To update (i.e., mark/remove/output the picture in the DPB) the DPB, the decoding apparatus may perform a bumping process for the DPB (i.e., the picture storage buffer in the DPB) based on the DPB related information and perform an operation of decreasing the DPB fullness.

In one embodiment, the decoding apparatus may invoke the bumping process based on the case of satisfying the first condition in which the number of pictures in the DPB is not greater than or equal to a value of the syntax element related to a maximum required size of the DPB (e.g., max_dec_pic_buffering_minus1[i]) plus 1.

In addition, the invoking of the bumping process may not be determined based on the second condition based on the syntax element (e.g., max_num_reorder_pics) related to a maximum picture reorder number of the DPB or the third condition based on the syntax element (e.g., max_latency_increase_plus1) related to maximum latency of the DPB. In other words, in the case that the second condition or the third condition is satisfied but the first condition is not satisfied, the encoding apparatus may not perform the operation of invoking the bumping process.

Here, the second condition may be a condition related to whether the number of pictures in the DPB marked as "needed for output" is greater than a value of the syntax element (e.g., max_num_reorder_pics) related to a maximum picture reorder number of the DPB. The third condition may be a condition related to whether a value of the syntax element (e.g., max_latency_increase_plus1) related to maximum latency of the DPB is not equal to 0, and whether there is at least one picture in the DPB marked as "needed for output" for which the associated variable PicLatencyCount is greater than or equal to MaxLatencyPictures[Htid]. MaxLatencyPictures[i] may be derived by (a value of the syntax element related to a maximum picture reorder number of the DPB+a value of the syntax element related to maximum latency of the DPB−1).

That is, in invoking the bumping process, as described above, since the second condition and the third condition are already examined when decoding of the previous picture is ended (i.e., during an additional bumping process), the second condition and the third condition may be redundant conditions in decoding the current picture. Accordingly, the bumping process may be performed by determining whether only the first condition is satisfied, not based on the second condition and the third condition that are redundant conditions (i.e., excluding the second condition and the third condition). As a particular example, in the case that the first condition based on the case that the number of pictures in the DPB is smaller than max_dec_pic_buffering_minus1[i])+1 (i.e., the number of pictures in the DPB is not greater than or equal to max_dec_pic_buffering_minus1[i])+1) is not satisfied, even in the case that the case that the following conditions i) and/or ii) are not true is satisfied, the bumping process may not be invoked.

i) The number of pictures in the DPB that are marked as "needed for output" is greater than max_num_reorder_pics[Htid].

ii) max_latency_increase_plus1 [Htid] is not equal to 0 and there is at least one picture in the DPB that is marked as "needed for output" for which the associated variable PicLatencyCount is greater than or equal to MaxLatencyPictures[Htid].

In addition, in one embodiment, the decoding apparatus may decrease the DPB fullness by 1 for the picture storage buffer that is emptied in the DPB during the bumping process that is invoked based on the case that the first condition is satisfied. In other words, after the bumping process invoked based on the case that the first condition is satisfied is performed, the decoding apparatus does not additionally perform the operation of decreasing the DPB fullness by 1 for the picture storage buffer that is emptied in the DPB during the bumping process. In one example, as described in Table 2 above, the additional operation of decreasing the DPB fullness by 1 for each additional picture storage buffer that is emptied may be removed from the invoking operation of the bumping process. In this case, the bumping process is invoked until the number of pictures in the DPB is not greater than or equal to max_dec_pic_buffering_minus1[Htid]+1 (i.e., the case that the first condition is satisfied), and the DPB fullness may be decreased once only within the invoked bumping process operation. Since the detailed operation process of the bumping process is as described above, the description is omitted here.

In addition, in one embodiment, the decoding apparatus may determine whether the bumping process is invoked based on whether the current picture is the first picture of the current access unit (AU) that is a coded video sequence start (CVSS) access unit (AU) that is not AU 0. Here, AU 0 may designate the first AU of a bitstream, for example, AU 0 may be the first AU of a bitstream in a decoding order. In one example, as described in Table 2 above, in the case that the current AU is not a CVSS AU or in the case that the current AU is a CVSS AU that is not AU 0 but the current picture is not the first picture in the current AU, all picture storage buffers including a picture marked as "not needed for output" and "unused for reference" may be emptied (without an output). For each emptied picture storage buffer, the DPB fullness may be decreased by 1. Until the number of pictures in the DPB is not greater than or equal to max_dec_pic_buffering_minus1[Htid]+1, the bumping process may be repeatedly invoked.

That is, as described above, the decoding apparatus may perform removal and/or output a picture(s) in the DPB through an operation such as the bumping process based on the DPB related information and may update the DPB.

The decoding apparatus may decode the current picture based on the DPB (step S820).

In one embodiment, the decoding apparatus may decode the current picture based on the updated DPB. For example, the decoding apparatus may derive a prediction sample by performing an inter prediction for a block in the current picture based on a reference picture of the DPB and may generate a reconstructed sample and/or a reconstructed picture for the current picture based on the prediction sample. Meanwhile, for example, the decoding apparatus may derive a residual sample for a block in the current picture and may generate a reconstructed sample and/or a reconstructed picture through an addition of the prediction sample and the residual sample. The image information may include the residual information. Furthermore, the decoding apparatus may insert the decoded current picture into the DPB.

Later, as occasion demands, in order to improve subjective/objective image quality, the in-loop filtering process such as deblocking filtering, an SAO and/or ALF process may be applied to the reconstructed samples as described above.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present disclosure may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an internet streaming service providing apparatus, a three-dimensional (3D) video apparatus, a virtual reality (VR) apparatus, an augmented reality (AR) apparatus, a teleconference video apparatus, a transportation user equipment (e.g., vehicle (including an autonomous driving vehicle) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a digital video recorder (DVR), and the like.

Furthermore, the processing method to which the embodiment(s) of the present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 10:
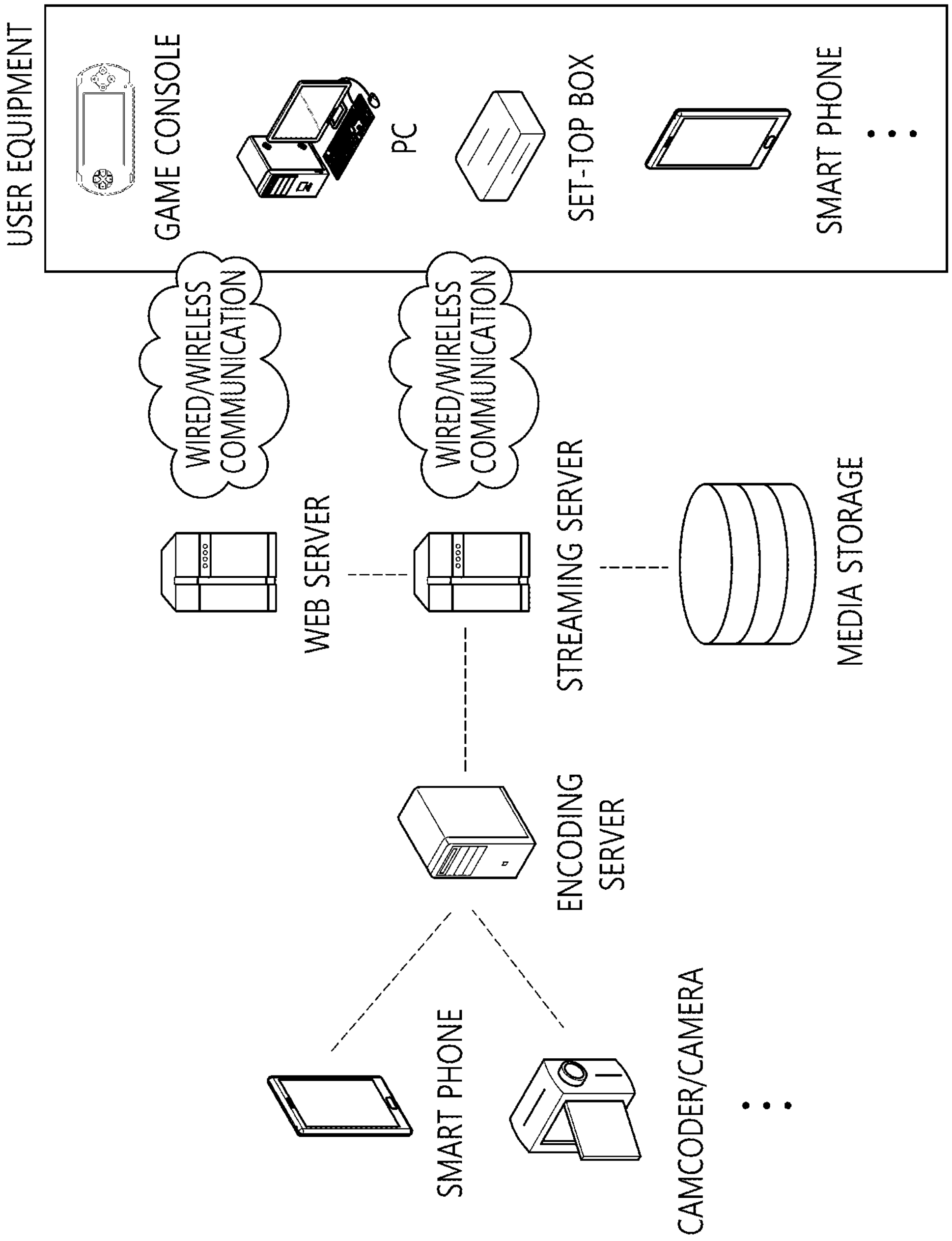
FIG. 10 illustrates an example of a content streaming system to which embodiments disclosed in the present document are applicable.

FIG. 10 represents an example of a contents streaming system to which the embodiment of the present document may be applied.

Referring to FIG. 10, the content streaming system to which the embodiments of the present document is applied may generally include an encoding server, a streaming.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present document can be combined in a various way. For example, technical features in method claims of the present document can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
- obtaining image information including decoded picture buffer (DPB) related information from a bitstream;
- updating a DPB based on the DPB related information; and
- decoding a current picture based on the DPB,
- wherein the DPB related information includes a syntax element related to a maximum required size of the DPB, and
- wherein based on (i) the current picture not being a first picture of a coded video sequence start (CVSS) access unit (AU) that is different from AU 0 and (ii) a first condition in which a number of pictures in the DPB is greater than or equal to a value of the syntax element related to the maximum required size of the DPB plus 1 being satisfied, a bumping process is invoked repeatedly only until the number of pictures in the DPB is less than the value of the syntax element related to the maximum required size of the DPB plus 1, and
- wherein the AU 0 is a first AU of the bitstream.

2. The image decoding method of claim 1, wherein the DPB related information includes a syntax element related to a maximum picture reorder number of the DPB or a syntax element related to maximum latency of the DPB, and
- wherein the invoking of the bumping process is not determined based on a second condition based on the syntax element related to the maximum picture reorder number of the DPB or a third condition based on the syntax element related to the maximum latency of the DPB.

3. The image decoding method of claim 2, wherein the bumping process is not invoked based on a case that the second condition or the third condition is satisfied, but the first condition is not satisfied.

4. The image decoding method of claim 2, wherein the second condition is a condition related to whether a number of pictures in the DPB marked as "needed for output" is greater than a value of the syntax element related to the maximum picture reorder number of the DPB,
- wherein the third condition is a condition related to whether a value of the syntax element related to the maximum latency of the DPB is not equal to 0, and whether there is at least one picture in the DPB marked as "needed for output" for which the associated variable PicLatencyCount is greater than or equal to MaxLatencyPictures, and
- wherein the MaxLatencyPictures is derived by (a value of the syntax element related to the maximum picture reorder number of the DPB+a value of the syntax element related to the maximum latency of the DPB−1).

5. The image decoding method of claim 1, wherein a DPB fullness is decreased by 1 for a picture storage buffer that is emptied in the DPB during the bumping process that is invoked based on the case that the first condition is satisfied.

6. The image decoding method of claim 1, after the bumping process invoked based on the case that the first condition is satisfied is performed, wherein an operation of decreasing a DPB fullness by 1 additionally for a picture storage buffer that is emptied in the DPB is not performed.

7. An image encoding method, performed by an encoding apparatus, the method comprising:
- generating decoded picture buffer (DPB) related information;
- updating a DPB based on the DPB related information; and
- encoding image information including the DPB related information,
- wherein the DPB related information includes a syntax element related to a maximum required size of the DPB, and
- wherein based on (i) a current picture not being a first picture of a coded video sequence start (CVSS) access unit (AU) that is different from AU 0 and (ii) a first condition in which a number of pictures in the DPB is greater than or equal to a value of the syntax element related to the maximum required size of the DPB plus 1 being satisfied, a bumping process is invoked repeatedly only until the number of pictures in the DPB is less than the value of the syntax element related to the maximum required size of the DPB plus 1, and
- wherein the AU 0 is a first AU of the bitstream.

8. The image encoding method of claim 7, wherein the DPB related information includes a syntax element related to a maximum picture reorder number of the DPB or a syntax element related to maximum latency of the DPB, and
- wherein the invoking of the bumping process is not determined based on a second condition based on the syntax element related to the maximum picture reorder number of the DPB or a third condition based on the syntax element related to the maximum latency of the DPB.

9. The image encoding method of claim 8, wherein the bumping process is not invoked based on a case that the second condition or the third condition is satisfied, but the first condition is not satisfied.

10. The image encoding method of claim 8, wherein the second condition is a condition related to whether a number of pictures in the DPB marked as "needed for output" is greater than a value of the syntax element related to the maximum picture reorder number of the DPB,
- wherein the third condition is a condition related to whether a value of the syntax element related to the maximum latency of the DPB is not equal to 0, and whether there is at least one picture in the DPB marked as "needed for output" for which the associated variable PicLatencyCount is greater than or equal to MaxLatencyPictures, and
- wherein the MaxLatencyPictures is derived by (a value of the syntax element related to the maximum picture reorder number of the DPB+a value of the syntax element related to the maximum latency of the DPB−1).

11. The image encoding method of claim 7, wherein a DPB fullness is decreased by 1 for a picture storage buffer that is emptied in the DPB during the bumping process that is invoked based on the case that the first condition is satisfied.

12. The image encoding method of claim 7, after the bumping process invoked based on the case that the first condition is satisfied is performed, wherein an operation of decreasing a DPB fullness by 1 additionally for a picture storage buffer that is emptied in the DPB is not performed.

13. A non-transitory computer-readable storage medium for storing a bitstream generated by the image encoding method of claim 7.

14. A method for transmitting data for image information comprising:

generating decoded picture buffer (DPB) related information;

updating a DPB based on the DPB related information; and encoding the image information including the DPB related information, wherein the DPB related information includes a syntax element related to a maximum required size of the DPB, and wherein based on (i) a current picture not being a first picture of a coded video sequence start (CVSS) access unit (AU) that is different from AU 0 and (ii) a first condition in which a number of pictures in the DPB is greater than or equal to a value of the syntax element related to the maximum required size of the DPB plus 1 being satisfied, a bumping process is invoked repeatedly only until the number of pictures in the DPB is less than the value of the syntax element related to the maximum required size of the DPB plus 1, and wherein the AU 0 is a first AU of the bitstream.

* * * * *